United States Patent
Squeri et al.

(10) Patent No.: US 10,429,252 B1
(45) Date of Patent: Oct. 1, 2019

(54) FLEXIBLE CAPACITIVE PRESSURE SENSOR

(71) Applicant: W. L. Gore & Associates, Inc., Newark, DE (US)

(72) Inventors: John M. Squeri, Downingtown, PA (US); Minghua Xu, Hockessin, DE (US)

(73) Assignee: W. L. Gore & Associates, Inc., Newark, DE (US)

( * ) Notice: Subject to any disclaimer, the term of this patent is extended or adjusted under 35 U.S.C. 154(b) by 205 days.

(21) Appl. No.: 15/688,210

(22) Filed: Aug. 28, 2017

Related U.S. Application Data

(60) Provisional application No. 62/380,204, filed on Aug. 26, 2016.

(51) Int. Cl.
*G01L 1/14* (2006.01)
*G01L 9/10* (2006.01)
*G01L 9/12* (2006.01)
*G01L 5/10* (2006.01)
*H01G 13/00* (2013.01)

(52) U.S. Cl.
CPC .............. *G01L 1/146* (2013.01); *G01L 1/144* (2013.01); *G01L 1/148* (2013.01); *G01L 5/10* (2013.01); *G01L 9/12* (2013.01); *H01G 13/00* (2013.01)

(58) Field of Classification Search
CPC . G01L 1/14; G01L 1/144; G01L 1/146; G01L 1/148; G01L 9/00; G01L 9/10; G01L 9/12; G01L 5/10; H01G 13/00
See application file for complete search history.

(56) References Cited

U.S. PATENT DOCUMENTS

| | | |
|---|---|---|
| 3,228,030 A | 1/1966 | Moore |
| 4,206,762 A | 6/1980 | Cosman |
| 5,480,415 A | 1/1996 | Cox et al. |
| 6,015,386 A | 1/2000 | Kensey |
| 6,206,835 B1 | 3/2001 | Spillman et al. |
| 6,855,115 B2 | 2/2005 | Cardiomems |
| 7,146,861 B1 | 12/2006 | Cook et al. |
| 7,181,975 B1 | 2/2007 | Bradley |
| 7,191,013 B1 | 3/2007 | Miranda et al. |
| 7,245,117 B1 | 7/2007 | Joy |
| 7,399,313 B2 | 7/2008 | Brown et al. |
| 7,452,334 B2 | 11/2008 | Gianchandani |
| 7,568,394 B1 | 8/2009 | Keilman et al. |
| 7,647,831 B2 | 1/2010 | Cardiomems |
| 7,677,107 B2 | 3/2010 | Nunez et al. |

(Continued)

FOREIGN PATENT DOCUMENTS

WO WO-2006040781 A2 * 4/2006 ........... G01D 5/2405

*Primary Examiner* — Nguyen Q. Ha

(57) ABSTRACT

A flexible passive capacitance pressure sensor includes a first polymeric substrate and a second polymeric substrate. An elastic dielectric sensing material is positioned between the inner-facing surface of the first polymeric substrate and the inner-facing surface of the second polymeric substrate. A first plurality of wires are positioned on the outer-facing surface of said first polymeric substrate, and a second plurality of wires positioned on the outer-facing surface of said second polymeric substrate. The plurality of wires form a flexible capacitor. With the reduced profile enabled by such a capacitor, the flexible passive capacitance pressure sensor can have a thickness of less than 200 microns.

20 Claims, 5 Drawing Sheets

(56) References Cited

U.S. PATENT DOCUMENTS

| | | |
|---|---|---|
| 7,955,268 B2 | 6/2011 | Huelskamp |
| 8,072,310 B1 | 12/2011 | Everhart |
| 8,187,317 B2 | 5/2012 | Leprince et al. |
| 8,372,139 B2 | 2/2013 | Bailey et al. |
| 8,432,265 B2 | 4/2013 | Rowland |
| 8,493,187 B2 | 7/2013 | Rowland et al. |
| 2004/0082867 A1 | 4/2004 | Esch |
| 2007/0186677 A1* | 8/2007 | Zunino, III ............. G01L 1/148 73/849 |
| 2008/0033527 A1 | 2/2008 | Nunez et al. |
| 2008/0127739 A1* | 6/2008 | DeAngelis ............. G01L 1/146 73/718 |
| 2009/0030291 A1 | 1/2009 | O'Brien |
| 2010/0058583 A1 | 3/2010 | Cros et al. |
| 2010/0107770 A1* | 5/2010 | Serban .................... G01L 1/142 73/718 |
| 2011/0120228 A1* | 5/2011 | Main ....................... G01L 1/146 73/724 |
| 2013/0148255 A1* | 6/2013 | Taylor .................... H01G 4/015 361/275.4 |
| 2013/0165801 A1 | 6/2013 | Min |
| 2013/0197336 A1 | 8/2013 | Flo et al. |
| 2014/0128687 A1 | 5/2014 | White et al. |
| 2014/0273824 A1 | 9/2014 | Fenner et al. |
| 2014/0296687 A1 | 10/2014 | Irazoqui et al. |
| 2014/0306807 A1 | 10/2014 | Rowland et al. |
| 2014/0350348 A1 | 11/2014 | Tee et al. |
| 2015/0177077 A1* | 6/2015 | Hanson .................. G01L 1/146 73/862.626 |
| 2015/0196225 A1 | 7/2015 | Rusu |
| 2016/0029956 A1 | 2/2016 | Rowland |
| 2016/0231098 A1* | 8/2016 | Otaka ..................... G06F 3/044 |
| 2019/0131969 A1* | 5/2019 | Boese ................... H03K 17/962 |
| 2019/0137322 A1* | 5/2019 | Choi ....................... G01G 3/13 |

* cited by examiner

FLEXIBLE CAPACITIVE PRESSURE SENSOR

RELATED APPLICATIONS

This application claims priority to U.S. Provisional Application No. 62/380,204, filed Aug. 26, 2016, and titled FLEXIBLE CAPACITIVE PRESSURE SENSOR. The contents of that application (including the Appendix) are incorporated herein by reference for all purposes.

FIELD

Embodiments of the present disclosure generally relate to improved medical devices and other applications outside the medical field. More specifically, embodiments of the present disclosure relate to improved devices for measuring and monitoring pressure within areas that require increasing flexibility and endurance as well as decreasing size. For example embodiments of the present disclosure are applicable to human vessels and joints. Embodiments of the present disclosure are also applicable to industrial applications.

BACKGROUND

Measuring and monitoring pressure is an important diagnostic tool in many medical treatments, especially when treating vascular maladies. For example, aneurysms are often treated by implanting a stent-graft within the aneurysm pocket. Measuring and monitoring blood pressure at the stent-graft can be important in tracking patient health and treatment effectiveness. Pressure sensors within the medical field can be placed in various areas throughout the body, such as within joints, gastrointestinal and spinal locations. The ability to place pressure sensors within industrial applications can also be an effective tool for measuring and monitoring conditions of a process or product.

Various pressure sensors have been used for measuring blood pressure within a vessel or other areas of the body, including capacitive pressure sensors. However, those sensors often require protective casings or inflexible coatings that render the sensors less practical for use with flexible stent-grafts and the minimally invasive insertion techniques typically used with stent-grafts. Such pressure sensors are generally delivered via a catheter directly at the site of the surgery.

The pressure sensors themselves can be formed by metal (e.g., gold or copper) deposition on a polyimide backplane. However, if these sensors are forced into stent-grafts through bending, their inflexible nature will cause the metal and/or polyimide layers to break apart, and eventually these pressure sensors may fail because of fatigue and/or cracking. Furthermore, while some pressure sensors have moved towards using metal traces on a silicone/urethane backplane, such designs are still limited in their flexibility and longevity. For example, typical sensors of this form factor do not lend themselves to be placed within confined areas, flex-endurant areas, or in other such areas where capacitive sensors could be placed if durable enough.

Other pressure sensors omit protective layers entirely, which severely limits the longevity of those pressure sensors. For example, many pressure sensors rely on a flex circuit design not intended for long term implantation.

There is an unmet need to develop a thin, flexible capacitive sensor that can be incorporated into a stent-graft or other forms and can be placed in constrained spaces within the body or industrial applications in which particular temperature, flex, strength requirements are needed.

SUMMARY

According to one example, a flexible passive capacitance pressure sensor comprises: a first polymeric substrate having an inner surface and an outer surface; a second polymeric substrate having an inner surface and an outer surface; an elastic dielectric sensing material positioned between the inner surface of the first polymeric substrate and the inner surface of the second polymeric substrate; a first plurality of wires positioned on said outer surface of said first polymeric substrate; and a second plurality of wires positioned on said outer surface of said second polymeric substrate. In this example, the flexible passive capacitance pressure sensor has a thickness less than 200 microns.

In one variation of that example, the wires of the first plurality of wires are positioned substantially parallel to each other. In another variation of that example, the wires of the first plurality of wires are positioned substantially parallel to the wires of the second plurality of wires.

In one variation of that example, the wires of the first plurality of wires form a mesh of wires.

In one variation of that example, the thickness of the flexible passive capacitance pressure sensor is less than 100 microns.

In one variation of that example, the first and second polymeric substrates are PTFE membranes.

In one variation of that example, the first and second polymeric substrates are conductive.

In one variation of that example, the first and second polymeric substrates are non-conductive.

According to a second example, a flexible passive capacitance pressure sensor comprises: a first polymeric substrate having an inner surface and an outer surface; a second polymeric substrate having an inner surface and an outer surface; an elastic dielectric sensing material positioned between said first polymeric substrate and said second polymeric substrate on said inner surfaces of said first and second polymeric substrates; a first metallized film positioned on said outer surface of said first polymeric substrate; and second metallized film positioned on said outer surface of said second polymeric substrate. In this second example, the passive capacitance pressure sensor has a thickness less than 200 microns.

In one variation of that example, the metallized film has thereon a coating comprising a metal.

In one variation of that example, the first and second polymeric substrates are PTFE membranes.

In one variation of that example, the first and second polymeric substrates are non-conductive.

In one variation of that example, the first and second polymeric substrates are conductive.

In one variation of that example, the passive capacitance pressure sensor has a thickness less than 100 microns.

In one variation of that example, the metallized film is a substrate having thereon a vapor-deposited metal.

In one variation of that example, the metallized film is a thin metal foil adhered to a substrate.

In a third example, a flexible passive capacitance pressure sensor comprises: a first polymeric substrate having an inner surface and an outer surface; a second polymeric substrate having an inner surface and an outer surface; an elastic dielectric sensing material positioned between said first polymeric substrate and said second polymeric substrate on said inner surfaces of said first and second polymeric substrates; a first conductive, filled expanded polytetrafluoroethylene (ePTFE) membrane positioned on said outer surface of said first polymeric substrate; and a second conductive, filled ePTFE membrane positioned on said outer surface of said second polymeric substrate. In that third example, the passive capacitance pressure sensor has a thickness less than 200 microns.

In one variation of that example, the ePTFE membrane is filled with conductive materials.

In one variation of that example, the passive capacitance pressure sensor has a thickness less than 100 microns.

In one variation of that example, the elastic dielectric sensing material is silicone. In other examples, the elastic dielectric sensing material includes urethanes, rubbers, fluoroelastomers, ePTFE materials filled with such elastomeric materials, combinations of those materials, and other such materials.

While multiple embodiments are disclosed, still other embodiments of the present invention will become apparent to those skilled in the art from the following detailed description, which shows and describes illustrative embodiments of the invention. Accordingly, the drawings and detailed description are to be regarded as illustrative in nature and not restrictive.

Figure 1:
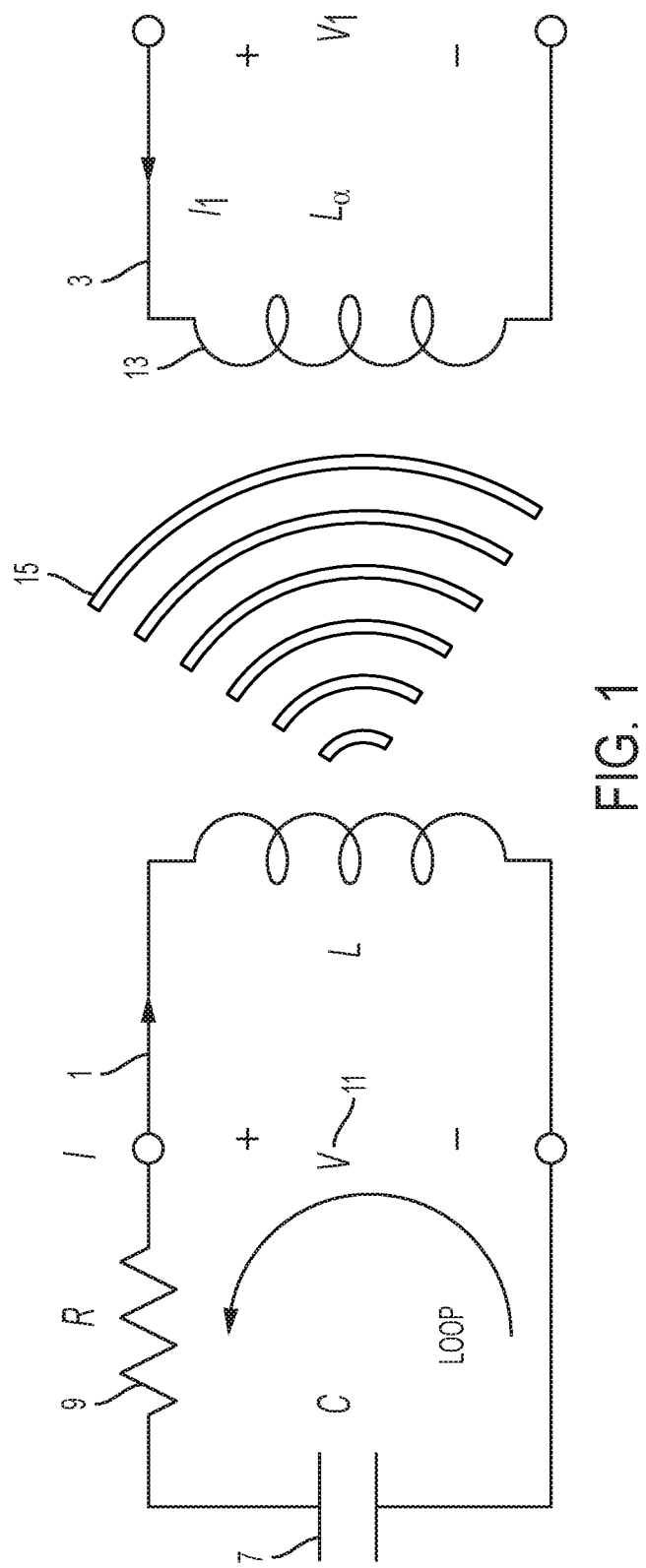
FIG. 1 illustrates a diagram of an exemplary oscillating circuit and an exemplary monitoring circuit, according to embodiments of the present disclosure.

While the invention is amenable to various modifications and alternative forms, specific embodiments have been shown by way of example in the drawings and are described in detail below. The intention, however, is not to limit the invention to the particular embodiments described. On the contrary, the invention is intended to cover all modifications, equivalents, and alternatives falling within the scope of the invention as defined by the appended claims.

DETAILED DESCRIPTION

According to some embodiments and as shown in FIG. 1, an LC circuit 1 and a monitoring circuit 3 can be used to safely monitor blood pressure and other parameters within a vessel (such as temperature). A capacitive sensor can be used in many industrial applications as well as other areas of the body, such as the brain, spinal cord, and gastrointestinal system. The LC circuit 1 includes an inductor 5 electrically connected to a capacitor 7. As one of skill in the art will readily appreciate, there are a wide variety of electrical components that exhibit capacitive and inductive characteristics and that can be used in various embodiments discussed herein. As also shown in FIG. 1, a resistor 9 completes the LC circuit 1. The resistor 9 may be an equivalent resistor that represents energy loss due to RF absorption or other energy losses.

The LC circuit 1 can also be referred to as an LC tank or LC tank circuit because of the voltage 11 that it can store. The LC tank 1 has a resonant frequency that depends on the inductance and capacitance provided by the inductor 5 and capacitor 7, respectively. The monitoring circuit 3, using its own inductor 13 or equivalent electrical components, detects the frequency at which the LC circuit 1 resonates. For example, the monitoring circuit 3 can measure the frequency of signals 15 emitted by the LC circuit 1. Because of the relationship between capacitance, inductance, and resonant frequency, a change in the resonant frequency of the LC circuit 1 can be used to determine a change in the capacitance of the LC circuit 1 and/or inductance of the LC circuit 1. Alternatively, the LC tank 1 can be directly coupled to a reader for measurements and/or monitoring. For example, a simple capacitive circuit can send an applied voltage to a monitoring circuit over an electrical connection.

One of the benefits of an LC tank (e.g., LC circuit 1 in FIG. 1) is that characteristics of that circuit (e.g., resonant frequency) can be measured without needing to include a power source, such as a battery, as part of the circuit. Instead, a monitoring tool (e.g., monitoring circuit 3 in FIG. 1) can interact wirelessly with that circuit to detect those characteristics of the LC tank.

For example, if a dielectric material that reacts to external pressure is placed within the capacitor (e.g., capacitor 7 in FIG. 1), a change in blood pressure will cause a change in capacitance in the LC tank, which results in a change in its resonant frequency. For another example, the LC tank may be set up so that the plates of the capacitor move in response to external pressures, which will affect the capacitance and the resonant frequency of the LC tank. Under either approach, if the other characteristics of the LC tank (e.g., inductance) remain relatively constant, the change in resonant frequency can be used to determine the change in capacitance, which can then be used to determine a measurement of the blood pressure within the vessel.

Figure 2:
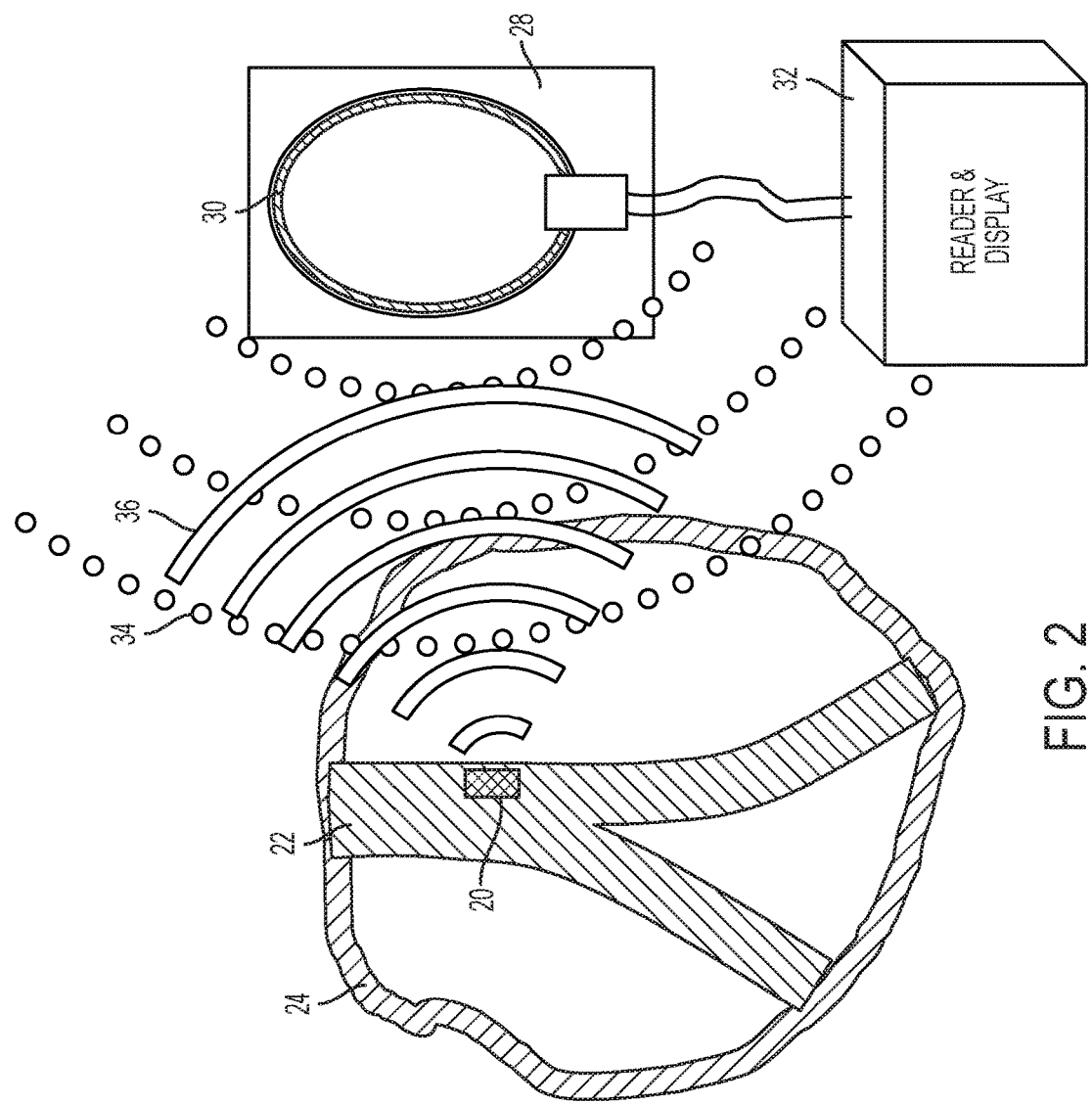
FIG. 2 illustrates an exemplary pressure sensor coupled to a stent graft as well as an exemplary measuring tool, according to embodiments of the present disclosure.

These approaches can be seen in FIG. 2, in which a pressure sensor 20 uses an LC circuit to monitor blood pressure at a stent-graft 22 placed to treat an aneurism in the body 24. In various embodiments, the pressure sensor 20 may be placed on an outer surface of the stent-graft, an inner surface of the stent-graft, or may be integrated within the stent-graft. Thus, measuring blood pressure at the stent-graft includes measuring blood pressure outside of the stent-graft and/or within the stent-graft. The measuring device 28 includes an antenna 30 and a reader/display 32. The reader/display 32 can include a processor, memory, and other hardware and/or software needed to measure signals from the antenna 30 and process those signals to determine (and perhaps display) the blood pressure measurements. The measuring device 28 emits a pulse 34, which causes the pressure sensor to emit a ring-down signal 36. The measuring device 28 analyzes the ring-down signal 36 to identify pressure within the stent-graft 22.

In some embodiments, the antenna 30 emits signals 34 (e.g., RF signals) at a variety of frequencies at different times and measures when the pressure sensor 20 absorbs those frequencies. In other embodiments, the antenna 30 emits energy signals 34 at a variety of frequencies simultaneously and then detects energy 36 emitted from the LC circuit within the pressure sensor 20, which will indicate the resonant frequency of the LC circuit. As discussed above, measurements of the resonant frequency can be used to determine blood pressure at the pressure sensor 20.

Figure 3:
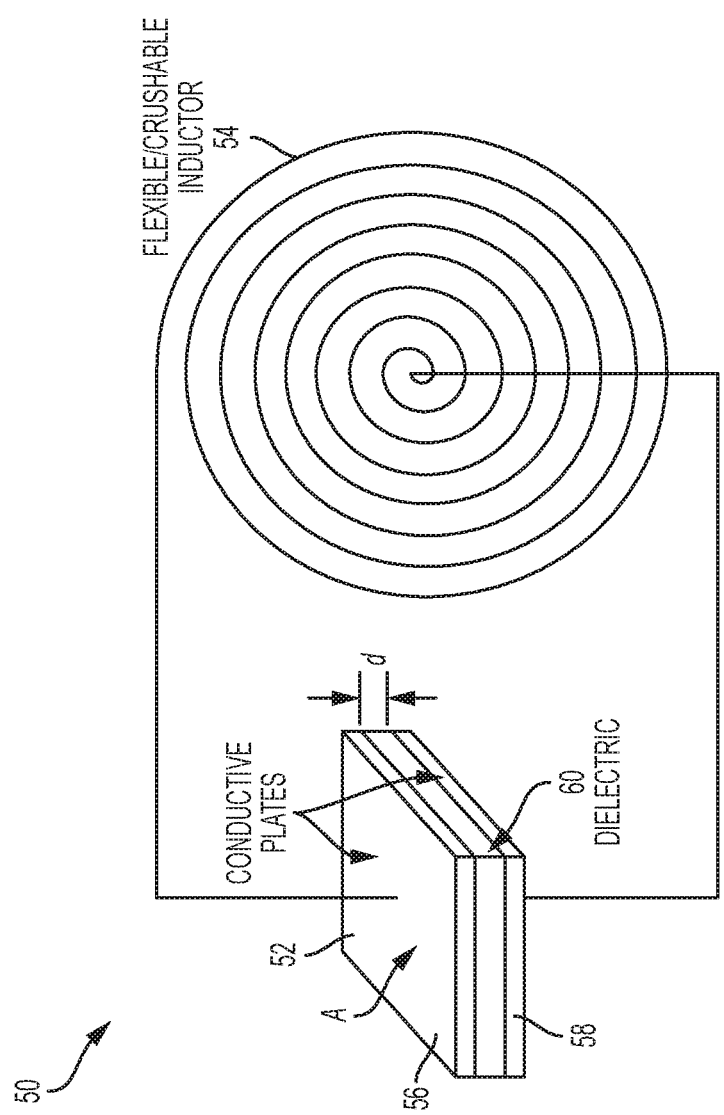
FIG. 3 illustrates an exemplary LC circuit, according to embodiments of the present disclosure.

FIG. 3 illustrates aspects of an exemplary LC circuit 50, which includes a capacitor 52 and an inductor 54 connected in series. In some embodiments, the inductor 54 is a flexible or crushable inductor. This enables the LC circuit 50 to be compressed into a smaller profile to facilitate, e.g., placement within the patient. The capacitor 52 is formed of two conductive plates 56, 58 each with an area ("A") and separated by a distance ("d"). In some embodiments, a dielectric material 60 is placed between the conductive plates. The dielectric material 60 may be an elastic dielectric material that responds to external pressures (e.g., blood pressure), such that the capacitance of the capacitor 52 changes in response to changes to external pressures. In other embodiments, the capacitor 52 itself responds to changes in external pressures by changing the distance between the two conductive plates 56, 58. In some embodiments, the LC circuit 50 uses both features to respond to changes in external pressure.

In some of the embodiments discussed below in more detail, a pressure sensor includes an LC circuit designed for increased flexibility and implantability, and to provide continuous monitoring over an extended period of time. For example, these exemplary pressure sensors are able to withstand a number of cycles without breaking (e.g., crush/deployment cycles, pressure cycles, and the like). The capacitors are typically formed by metallic parallel plates. However, those plates are rigid and stiff. Particularly in view of their thin constructions, the tensile and flex endurance properties of these plates limit their effectiveness in forming implantable sensors in stent-grafts and other LC applications that require thinness, flexibility, endurance, and chemical resistance. To address some or all of these issues, various embodiments utilize a pressure sensor that includes a modified capacitor.

Figure 4:
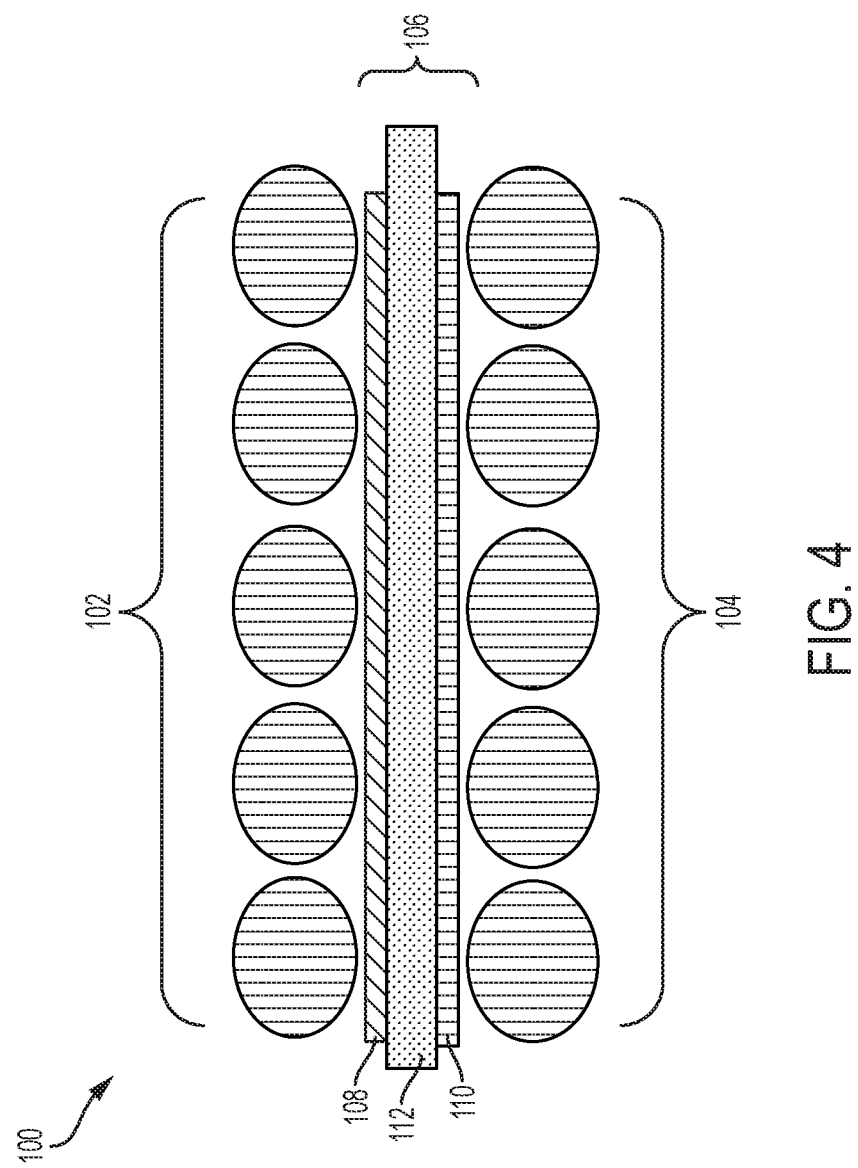
FIG. 4 illustrates an exemplary capacitive element using two pluralities of wires, according to embodiments of the present disclosure.

FIG. 4 illustrates one example of a modified capacitor or capacitor element. In particular, a capacitive element 100 includes a plurality of fine wires 102 and 104 separated by a gap 106. The wires 102, 104 can be selected from a group of metals that exhibit low resistance, such as copper MP35, silver, gold, platinum, iridium, conductive fibers, and the like. Within that gap 106 is a thin film substrate 108 bonded to the wires 102 (and/or 104). A second thin film substrate 110 may be bonded to the wires 104 (and/or 102). These substrates may be conductive or non-conductive and may be formed of polymeric substrates, such as ePTFE, fluoroelastomers, silicones, pvdf, etfe, fluoropolymers, filled ePTFE, PVDF or other similar materials. For example, the ePTFE may form a thin film in which a conductor is enveloped. Exemplary techniques for constructing a thin, filled ePTFE film are discussed in U.S. Pat. No. 4,187,390 to Gore and U.S. Pat. No. 4,985,296 to Mortimer, Jr.

Also within that gap 106 is an elastic dielectric material 112. That elastic dielectric material 112 may be formed of silicone, urethane, fluoroelastomers, combinations of these materials, such as ePTFE/elastomer combinations, or any other elastic material with or without ePTFE, or the like, and is responsive to changes in external pressures. The elastic dielectric material 112 may also be formed of substances that respond to changes in temperature or other parameters. When configured in this manner, the wires 102 and 104 (and in some embodiments the thin film substrates) form a capacitor.

In some embodiments, the plurality of wires 102 (and/or the plurality of wires 104) are formed of a mesh of flexible wires. In some embodiments, the plurality of wires 102 are positioned substantially parallel to each other. In some embodiments, plurality of wires 102 are positioned substantially parallel to the plurality of wires 104. The plurality of wires 102 (and/or 104) may be insulated (either individually or as a group) or may remain non-insulated. These wires 102, 104 provide a surface area similar to that provided by rigid plates in other capacitors. However, using these wires in these fashions increases the ability of the capacitive element 100 to flex and bend. This advantage is particularly important when considering the narrow confines of the blood vessels in which these pressure sensors may be inserted and operate. Other advantages of these capacitive elements include improving the overall strength of the capacitor and diminishing the thickness of the capacitor, and therefore the pressure sensor.

Figure 5:
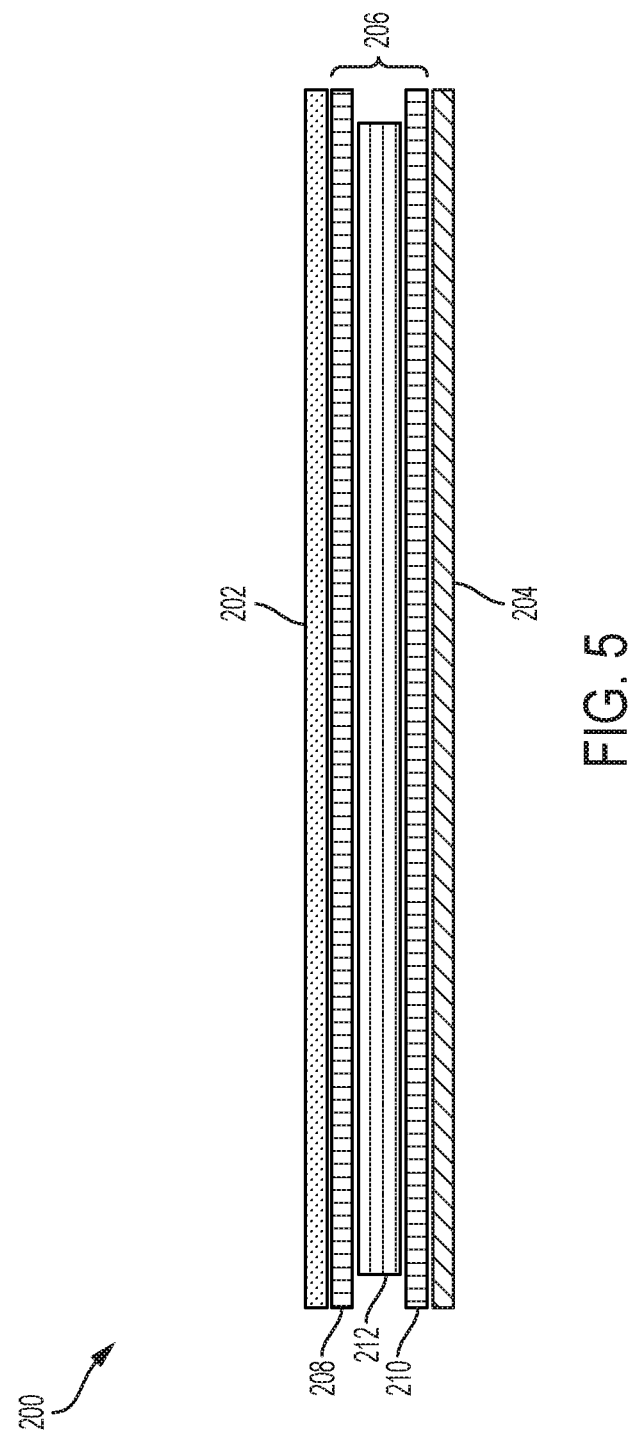
FIG. 5 illustrates an exemplary capacitive element using two thin films, according to embodiments of the present disclosure.

FIG. 5 illustrates another example of a modified capacitor. In these embodiments, a capacitive element 200 includes an upper thin film 202. In some embodiments, the upper thin film 202 includes a conductive metal deposition coating, a thin metallized film, a thin metal foil adhered to a substrate, or a filled material, such as ePTFE or the like, filled with a conductive material such as carbon, carbon fibers, metal, or the like. The capacitive element 200 also includes a lower thin film 204, which may have the same composition as the upper thin film 202 or a similar composition, including a conductive metal deposition coating, a thin metallized film, a thin metal foil adhered to a substrate, or a filled material, such as ePTFE filled with a conductive material such as carbon, metal, or the like.

The upper thin film 202 and the lower thin film 204 are separated by a gap 206. Within that gap 206 is a thin film substrate 208 bonded to the upper thin film 202. The capacitive element 200 may also include a second thin film substrate 210 bonded to the lower thin film 204. These substrates can be conductive or non-conductive and may be formed of polymeric substrates, such as ePTFE, aluminum, copper, platinum, gold, silver, carbon or other similar materials. Also within that gap 206 is a dielectric material 212. That dielectric material 212 may be elastic and responsive to changes in external pressures. When configured in this manner, the upper thin film 202 and the lower thin film 204 (and in some embodiments the thin film substrates) form a capacitor, similar to the capacitor 52 in FIG. 3.

Capacitive elements (e.g., 100 in FIG. 4 or 200 in FIG. 5), according to embodiments of the present disclosure, can use meshes of wires oriented in various combination of directions. These wires may be in any shape and may be laminated to a thin durable PTFE film and sandwiched around a thin dielectric material. In addition to providing greater strength and flexibility, these capacitive elements also provide greater charge capacity because of the diminished distance between the meshes of wires and/or the increased area provided by the meshes of wires. In other embodiments, the capacitive elements use a thin foil laminated to a thin durable film, or filled metallic PTFE. In some embodiments, the wires and thin films are without terminations (i.e., with multiple wires placed together in various patterns, such as parallel, braided, or helical patterns). These capacitive elements are also crushable, meaning that they can be folded or compressed into a reduced profile for insertion without breaking or without significantly diminished electrical properties. The PTFE can protect the wires and/or thin foils and thus increase longevity of the sensor. For example, the low permeation, high dielectric properties of the PTFE will increase charge capacity while still enabling increased flexibility of the circuit.

In addition to increased strength and flexibility, the capacitive elements discussed above enable thinner capacitive pressure sensors. For example, in some embodiments a capacitive pressure sensor formed using, e.g., capacitive element 100 in FIG. 4, has a thickness of less than 200 microns or less than 100 microns. The wires forming the wire meshes (e.g., 102 or 104 in FIG. 4), have a thickness greater than or equal to 25 microns in some embodiments, and thin films (e.g., 202 or 204 in FIG. 5) greater than or equal to 5 microns.

In some embodiments, the capacitive elements (e.g., 100 in FIG. 4 or 200 in FIG. 5), may be used as part of a partially RF-shielded, water-barrier protected, double-shell LC resonator. U.S. Provisional Patent Application No. 62/380,206, titled WIRELESS CYLINDRICAL SHELL PASSIVE LC SENSOR and filed on Aug. 26, 2016, discusses several examples of such LC resonators, and the content of that application is incorporated by reference in its entirety. As discussed in that application, capacitive elements help form an LC circuit without electrical connections. The thinness, flexibility, and mechanical properties discussed in the embodiments of this disclosure can be applied to the designs in that application. For example, the RF shielding layers discussed in that application may be formed using the wire meshes and thin films discussed above with respect to FIGS. 4 and 5. For another example, RF shielding layers (306, 308 in that application) may be formed by a mesh of wires having a cylindrical shape and placement as discussed above. These wires may be wrapped in ePTFE (either individually or collectively), which serves as a water barrier.

The folding properties enabled by the durable thin material sets discussed in embodiments of this disclosure also enable unique crushing, resulting in easier delivery and/or unique placement of the sensor in various locations within the body or other industrial locations that have demanding temperature, flex or strength requirements. For example, the folding or crushing techniques, as well as the placement techniques discussed in U.S. Provisional Patent Application No. 62/380,206, titled WIRELESS CYLINDRICAL SHELL PASSIVE LC SENSOR and filed on Aug. 26, 2016, may be used with embodiments of the present disclosure.

Various modifications and additions can be made to the exemplary embodiments discussed without departing from the scope of the present invention. For example, while the embodiments described above refer to particular features, the scope of this invention also includes embodiments having different combinations of features and embodiments that do not include all of the above described features.

What is claimed is:

1. A flexible passive capacitance pressure sensor comprising:
    a first polymeric substrate having an inner surface and an outer surface;
    a second polymeric substrate having an inner surface and an outer surface;
    an elastic dielectric sensing material positioned between the inner surface of the first polymeric substrate and the inner surface of the second polymeric substrate;
    a first plurality of wires positioned on the outer surface of the first polymeric substrate; and
    a second plurality of wires positioned on the outer surface of the second polymeric substrate,
        wherein the flexible passive capacitance pressure sensor has a thickness less than 200 microns.

2. The flexible passive capacitance pressure sensor of claim 1, wherein the first plurality of wires are positioned substantially parallel to each other.

3. The flexible passive capacitance pressure sensor of claim 1, wherein the first plurality of wires are positioned substantially parallel to the second plurality of wires.

4. The flexible passive capacitance pressure sensor of claim 1, wherein the first plurality of wires form a mesh of wires.

5. The flexible passive capacitance pressure sensor of claim 1, wherein the thickness of the flexible passive capacitance pressure sensor is less than 100 microns.

6. The flexible passive capacitance pressure sensor of claim 1, wherein the first and second polymeric substrates are PTFE membranes.

7. The flexible passive capacitance pressure sensor of claim 1, wherein the first and second polymeric substrates are conductive.

8. The flexible passive capacitance pressure sensor of claim 1, wherein the first and second polymeric substrates are non-conductive.

9. A flexible passive capacitance pressure sensor comprising:
    a first polymeric substrate having an inner surface and an outer surface;
    a second polymeric substrate having an inner surface and an outer surface;
    an elastic dielectric sensing material positioned between the first polymeric substrate and the second polymeric substrate on the inner surfaces of the first and second polymeric substrates;
    a first metallized film positioned on the outer surface of the first polymeric substrate; and
    a second metallized film positioned on the outer surface of the second polymeric substrate,
        wherein the flexible passive capacitance pressure sensor has a thickness less than 200 microns.

10. The flexible passive capacitance pressure sensor of claim 9, wherein the first metallized film has thereon a coating comprising a metal.

11. The flexible passive capacitance pressure sensor of claim 9, wherein the first and second polymeric substrates are PTFE membranes.

12. The flexible passive capacitance pressure sensor of claim 9, wherein the first and second polymeric substrates are non-conductive.

13. The flexible passive capacitance pressure sensor of claim 9, wherein the first and second polymeric substrates are conductive.

14. The flexible passive capacitance pressure sensor of claim 9, wherein the thickness of the flexible passive capacitance pressure sensor is less than 100 microns.

15. The flexible passive capacitance pressure sensor of claim 9, wherein the first metallized film is a substrate having thereon a vapor-deposited metal.

16. The flexible passive capacitance pressure sensor of claim 9, wherein the first metallized film is a thin metal foil adhered to a substrate.

17. A flexible passive capacitance pressure sensor comprising:
    a first polymeric substrate having an inner surface and an outer surface;
    a second polymeric substrate having an inner surface and an outer surface;
    an elastic dielectric sensing material positioned between the first polymeric substrate and the second polymeric substrate on the inner surfaces of the first and second polymeric substrates;
    a first conductive, filled expanded polytetrafluoroethylene (ePTFE) membrane positioned on the outer surface of the first polymeric substrate; and
    a second conductive, filled ePTFE membrane positioned on the outer surface of the second polymeric substrate, wherein the flexible passive capacitance pressure sensor has a thickness less than 200 microns.

18. The flexible passive capacitance pressure sensor of claim 17, wherein the ePTFE membrane is filled with conductive materials.

19. The flexible passive capacitance pressure sensor of claim 17, wherein the thickness of the flexible passive capacitance pressure sensor is less than 100 microns.

20. The flexible passive capacitance pressure sensor of claim 17, wherein the elastic dielectric sensing material includes silicone, urethane, fluoroelastomers or ePTFE/elastomer combinations.

* * * * *